United States Patent [19]

Wang

[11] Patent Number: 4,509,809
[45] Date of Patent: Apr. 9, 1985

[54] SIGNAL LEAD-OUT APPARATUS

[76] Inventor: Cheng-Shi Wang, Pai-Kou Village, Hua-Tan District, Chang-Hua Hsien, Taiwan

[21] Appl. No.: 478,117

[22] Filed: Mar. 23, 1983

[51] Int. Cl.³ .............................................. H01R 4/66
[52] U.S. Cl. .............................. 339/14 R; 339/177 R; 339/147 R; 339/DIG. 3
[58] Field of Search .................. 339/97 R, 97 P, 98, 339/99 R, 143 R, 147, DIG. 3, 14

[56] References Cited

U.S. PATENT DOCUMENTS

| | | | |
|---|---|---|---|
| 3,083,349 | 3/1963 | Blonder | 339/98 |
| 3,118,715 | 1/1964 | Potruch | 339/98 |
| 3,509,296 | 4/1970 | Harshman et al. | 339/DIG. 3 |
| 3,835,442 | 9/1974 | Anderson et al. | 339/DIG. 3 |
| 3,912,354 | 10/1975 | Campbell et al. | 339/DIG. 3 |
| 4,220,386 | 9/1980 | Kenny | 339/DIG. 3 |
| 4,295,699 | 10/1981 | DuRocher | 339/DIG. 3 |

FOREIGN PATENT DOCUMENTS

| | | | |
|---|---|---|---|
| 2236453 | 2/1973 | Fed. Rep. of Germany | 339/DIG. 3 |
| 2069251 | 8/1981 | Japan | 339/DIG. 3 |

Primary Examiner—Gil Weidenfeld
Assistant Examiner—David L. Pirlot
Attorney, Agent, or Firm—Sughrue, Mion, Zinn, Macpeak and Seas

[57] ABSTRACT

An improved signal lead-out apparatus comprises: a base body made in plate form having an oblong open groove formed in the internal side and an accommodating housing provided on the external side; a pinch-in device disposed in the open groove for the termination of the outgoing TV antenna wires; an elastic inserting device installed at one side of the accommodating housing for the termination of the incoming coaxial cable; a circuit device provided in the middle of the accommodating housing for the electrical connections made between the pinch-in device and the inserting device; and a covering plate coupled with the internal side of the base body and operated in cooperation with the pinch-in device for accomplishing the signal lead-out connections of the TV set therewith.

9 Claims, 7 Drawing Figures

SIGNAL LEAD-OUT APPARATUS

BACKGROUND OF THE INVENTION

This invention relates to an improved signal lead-out apparatus for facilitating the terminating operations of the incoming and outgoing signal wires in larger buildings.

Conventionally, a signal lead-out unit for a TV set in larger buildings is usually installed in a terminating box provided in the building wall. The way of connection is: from outdoor antenna→high-frequency coaxial cable→PVC pipe line→wall terminating box→signal lead-out unit→TV set. The structure of the known signal lead-out unit is shown in FIGS. 1 and 2, which unit is mainly constituted by a base plate 11 and a casing body 12. A pair of antenna screw posts 111 are provided on the base plate 11 for the connection of the outgoing TV antenna wires 112, and another pair of connecting screw pieces 121 and 122 are used for the termination of the incoming coaxial cable 123 of which the outer conductor is fastened by the connecting screw piece 121 while the inner conductor is secured by the connecting screw piece 122. The defects of the known signal lead-out unit are: (1) as the structural design of the whole unit is made in an old fashion, the awkward appearance is out of match with the coloful modern building; and (2) all the connections have to be done by screws, very inconvenient in operation.

SUMMARY OF THE INVENTION

It is accordingly a primary object of this invention to provide an improved signal lead-out apparatus that overcomes the aforesaid defects associated with the prior art.

According to the present invention, this and other objects are achieved by providing an improved signal lead-out apparatus which comprises: a plate-type base body having an oblong open groove formed in the internal side and an accommodating housing provided on the external side; a pinch-in device disposed in the open groove for the termination of the outgoing TV antenna wires; an elastic inserting device installed at one side of the accommodating housing for the termination of the incoming coaxial cable; a circuit device provided in the middle of the accommodating housing for making electrical connections between the pinch-in device and the inserting device; and a covering plate coupled within the internal side of the base body in cooperation with the pinch-in device for accomplishing the signal lead-out connection of the TV set.

The objects and advantages of the present invention will become apparent from the following detailed description which, taken in conjunction with annexed drawings, discloses a preferred embodiment of the present invention.

DETAILED DESCRIPTION OF THE PREFERRED EMBODIMENT

Figure 2:
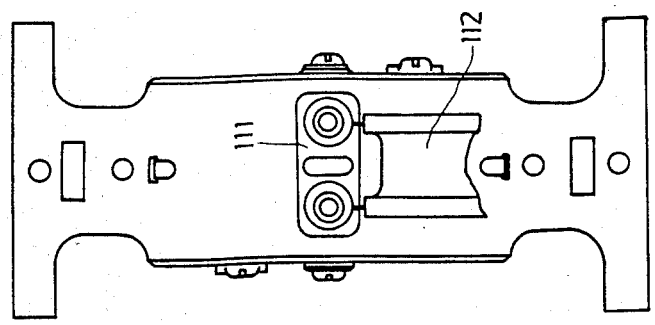
FIG. 2 is a front elevational view of the signal lead-out unit shown in FIG. 1.
Figure 1:
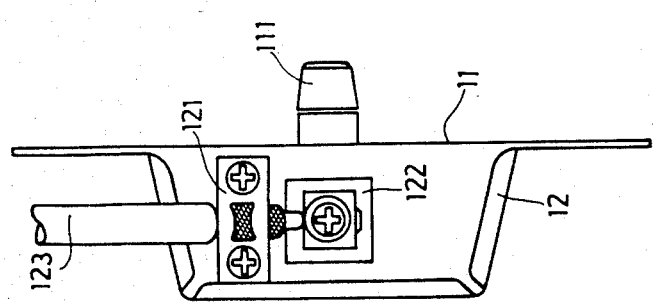
FIG. 1 is a side elevational view of a known signal lead-out unit.
Figure 3:
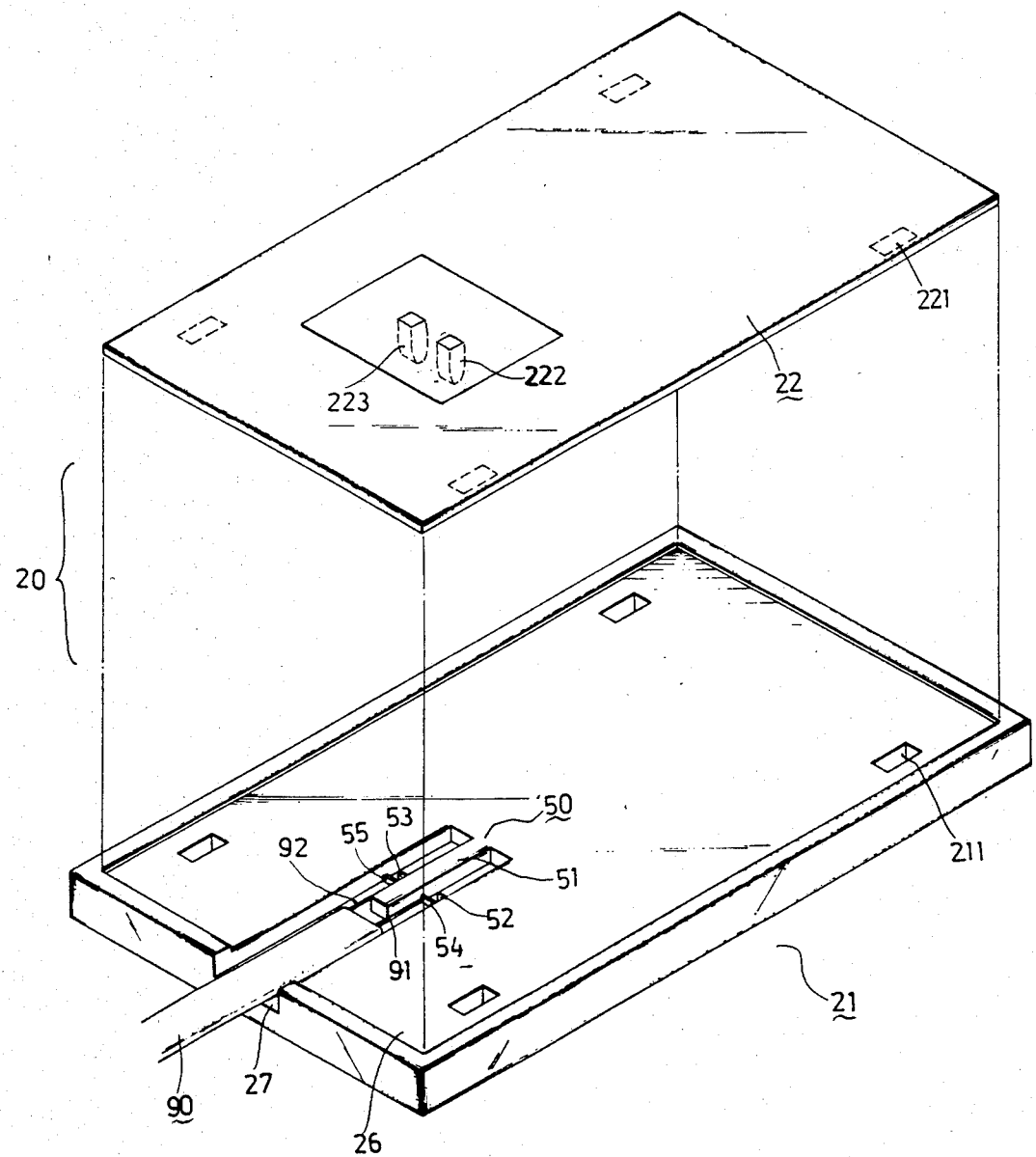
FIG. 3 is a perspective view of a preferred embodiment of a signal lead-out apparatus according to this invention.
Figure 4:
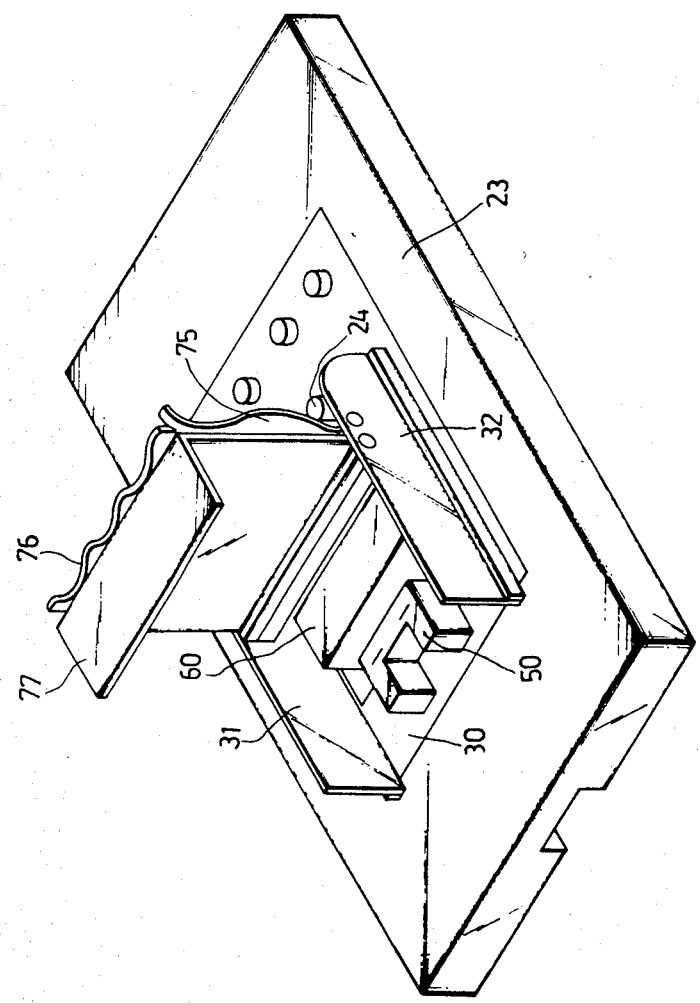
FIG. 4 is a perspective view of the external side of the preferred embodiment of FIG. 3.
Figure 5:
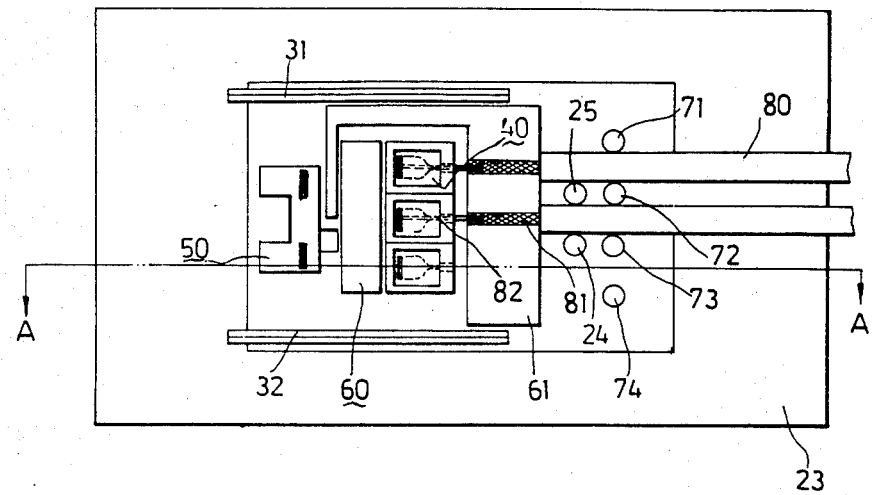
FIG. 5 is a partial top plan view of the preferred embodiment of FIG. 4.

Referring to FIGS. 3, 4 and 5, there is shown a preferred embodiment of an improved signal lead-out apparatus according to this invention, which apparatus comprises: a base body 21 made in plate form with an internal side 26 having a plurality of notches 211 formed at both ends and an oblong open groove 27 provided at one end portion, and an external side 23 having an accommodating housing 30 provided thereon; and a covering plate 22 having a plurality of lugs 221 formed at both ends of the inner side and corresponding to the notches 211 of the internal side 26 for being coupled with the base body 21.

Figure 7:
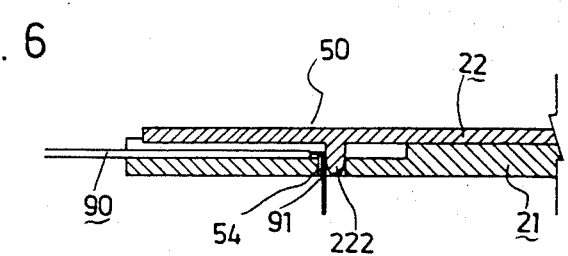
FIG. 7 is a sectional view of the pinch-in device taken along the line A—A of FIG. 5.

Referring to FIGS. 3 and 7, a pinch-in device 50 is provided in the open groove 27 and the covering plate 22, which device includes an oblong guide block 51 provided at one end of the open groove 27, a pair of square cavities 52 and 53 formed at both sides of the guide block 51, a pair of metal pieces 54 and 55 respectively secured on an internal side of the cavities 54 and 55, and a pair of pinch posts 222 and 223 corresponding to the cavities 52 and 53 integrally formed at the inner side of the covering plate 22 and located in conjunction with the cavities 52 and 53. When making connections with the outgoing TV antenna wire 90, the parallel conductor ends 91 and 92 are placed across the cavities 52 and 53, and the covering plate 22 is coupled with the base body 21 by pressing the pinch posts 222 and 223 into the cavities 52 and 53 along with the conductors 91 and 92 thereof, and the lugs 221 into the nocthes 211. The parallel conductors 91 and 92 will thus be tightly connected to the metal pieces 54 and 55 as soon as the covering plate 22 is closely coupled in position with the base body 21 on the internal side 26.

Figure 6:
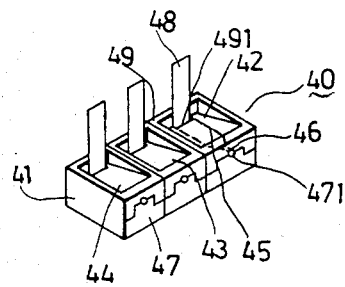
FIG. 6 is a perspective view of an elastic inserting device provided in the preferred embodiment shown in FIG. 5.

Referring to FIGS. 4, 5, and 6, installations provided in the accommodating housing 30 on the external side 23 of the base body 21 include a pair of oblong side plates 31 and 32 opposingly fixed in parallel upright position (as shown in FIG. 4) in defining the space therein, an elastic inserting device 40 disposed at the right side (as shown in FIG. 5) for the termination of the incoming coaxial cable 80, a circuit device 60 provided in the middle with terminals arranged therein for making electrical connections betwen the inserting device 40 and the metal pieces 54 and 55 of the pinch-in device 50 which is located in the left area on the internal side 26, and a grounding metal plate 61 provided in front of the elastic inserting device 40 for being contacted by the ground shield 81 of the coaxial cable 80. In addition, there are a plurality of guard posts 71, 72, 73 and 74 separately provided in front of the grounding plate 61 and arranged with proper spaces among the posts for keeping the coaxial cable 80 in position therein, a guard plate 75 (as shown in FIG. 4) movably connected to the plates 31 and 32 at both sides with the end portion of the guard plate 75 located over the top portion of the elastic inserting device 40, and an L-shaped guard cover 77 movably coupled with the plates 31 and 32 at both sides against the guard plate 75 for covering up the housing 30 and safekeeping the installations therein.

As shown in FIG. 4, the guard plate 75 is made in corrugated form with a plurality of curved grooves 76 shaped thereto, and a pair of orifices (cannot be seen in the Figure) are provided at both sides at the end portion corresponding to a pair of guard posts 24 and 25 (which is hidden at other side thereof) provided at both sides of the plates 31 and 32. Therefore, when the guard plate 75 is closed down to the opposite side of the L-shaped guard cover 77, the curved grooves 76 are respectively matched with the outside surface of the coaxial cable 80 held in position thereto, and the guard posts 24 and 25 thereof are separately engaged in the orifices (not shown) of the guard plate 75.

Referring to FIG. 6, the structure of the elastic inserting device 40 includes an oblong housing body 41 made of non-conductive material, a plurality of separate spaces 42, 43 and 44 provided therein for the installation of conducting elements thereof, a plurality of arcuate elastic chuck pieces 45 made of conductive material and formed with a chuck end 46 and a flake end 48 respectively fixed in the spaces 42, 43 and 44 and arranged in such a way that the chuck ends 46 are separately in communication with a plurality of apertures 471 integrally formed in a horizontal line along the frontal side 47 of the housing body 41 while the flake ends 48 extend upward respectively from a plurality of openings 491 formed in the upper side 49 of the housing body 41 for being electrically connected to the circuit device 60 thereof. As shown in FIG. 5, when making connections with the cable 80, the inner conductor 82 is inserted into the aperture 471, and continuously thrust forward until the inner conductor 82 is tightly seized by the chucking end 46 therein.

It shall be appreciated that the novel structure of the preferred embodiment of the improved signal lead-out apparatus according to this invention is appropriate for installation in larger buildings, and connections are secure and convenient for all occasions.

While a preferred embodiment has been chosen to illustrate the invention, it will be understood by those skilled in the art that various changes and modifications can be made therein without departing from the scope of the invention as defined in the appended claims.

What is claimed is:

1. An improved signal lead-out apparatus comprising:
   (a) a base body (21) having an open groove (27) for receiving outgoing TV antenna wires (90), a plurality of notches (211) formed in one side of said body, and an accommodating housing (30) provided on another side of said body;
   (b) pinch-in means (50) disposed in said open groove for the termination of said outgoing TV antenna wires;
   (c) an elastic inserting means (40) installed in said accommodating housing for the termination of an incoming coaxial cable;
   (d) a circuit device (60) provided in said accommodating housing for making electrical connections between said pinch-in means and said elastic inserting means; and
   (e) a covering device (22) coupled with said base body in cooperation with said pinch-in means for accomplishing signal lead-out connections therewith, wherein
   (f) said elastic inserting means comprises a housing body (41) of non-conductive material with a plurality of spaces (42, 43, 44) separately formed in a top side thereof and a plurality of apertures (471) horizontally formed in a frontal side thereof; and
   (g) a plurality of elastic chuck pieces (45) made of conductive material and each formed with a chuck end (46) and a flake end (48) respectively fixed in said spaces of said housing body with said chuck ends separately communicating with said apertures for making electrical connections with inner conductors of the incoming coaxial cable through inserting operations, and with said flake ends respectively extending out of the top side of said housing body for being connected to said circuit device thereof.

2. An improved signal lead-out apparatus according to claim 1 wherein said pinch-in means comprise:
   a guide block (51) provided in said open groove;
   a plurality of cavities (52, 53) respectively formed at opposite sides of said guide block; and
   a plurality of metal pieces (54, 55) separately secured on an internal side of said cavities for being respectively connected to parallel conductors of the outgoing TV antenna wires through the coupling of said covering device to said base body.

3. An improved signal lead-out apparatus according to claim 1 wherein said circuit device comprises:
   terminal means electrically connected between said flake ends of said elastic chuck pieces of said elastic inserting means and metal pieces of said pinch-in means; and
   a grounding metal plate (61) provided in front of said elastic inserating means for being contacted by a ground shield of the incoming coaxial cable.

4. An improved signal lead-out apparatus according to claim 1 wherein said covering device includes a covering plate having a plurality of lugs (221) formed at both ends of an inner side thereof for engagement in said notches of said base body, and a plurality of pinch-in posts (222, 223) integrally formed on the inner side in conformity with cavities of said pinch-in means to forcibly press parallel conductors of the outgoing TV antenna wires into said cavities when being coupled with said base body.

5. An improved signal lead-out apparatus comprising:
   (a) a base body (21) having an open groove (27) for receiving outgoing TV antenna wires (90), a plurality of notches (211) formed in one side of said body, and an accommodating housing (30) provided on another side of said body;
   (b) pinch-in means (50) disposed in said open groove for the termination of said outgoing TV antenna wires;
   (c) an elastic inserting means (40) installed in said accommodating housing for the termination of an incoming coaxial cable;
   (d) a circuit device (60) provided in said accommodating housing for making electrical connections between said pinch-in means and said elastic inserting means; and
   (e) a covering device (22) coupled with said base body in cooperation with said pinch-in means for accomplishing signal lead-out connections therewith, wherein
   (f) said accommodating housing comprises a pair of oblong side plates (31, 32) opposingly fixed thereon in parallel upright position defining a space therein; an L-shaped guard cover (77) movably connected to said side plates at both ends for covering up said space; and a corrugated guard plate (75) with a plurality of curved grooves (76) movably connected to said side plates at both ends aganst said L-shaped guard cover for providing a safekeeping covering over outer surfaces of the incoming coaxial cable.

6. An improved signal lead-out apparatus according to claim 5 wherein said elastic inserting means comprises:
   a housing body (41) of non-conductive material with a plurality of spaces (42, 43, 44) separately formed in a top side thereof and a plurality of apertures (471) horizontally formed in a frontal side thereof; and
   a plurality of elastic chuck pieces (45) made of conductive material and each formed with a chuck end (46) and a flake end (48) respectively fixed in said spaces of said housing body with said chuck ends separately communicating with said apertures for making electrical connections with inner conductors of the incoming coaxial cable through inserting operations, and with said flake ends respectively extending out of the top side of said housing body for being connected to said circuit device thereof.

7. An improved signal lead-out apparatus according to claim 5 wherein said pinch-in means comprise:
   a guide block (51) provided in said open groove;
   a purality of cavities (52, 53) respectively formed at opposite sides of said guide block; and
   a plurality of metal pieces (54, 55) separately secured on an internal side of said cavities for being respectively connected to parallel conductors of the outgoing TV antenna wires through the coupling of said covering device to said base body.

8. An improved signal lead-out apparatus according to claim 5 wherein said circuit device comprises:
   terminal means electrically connected between flake ends of elastic chuck pieces of said elastic inserting means and metal pieces of said pinch-in means; and
   a grounding metal plate (61) provided in front of said elastic inserting means for being contacted by a ground shield of the incoming coaxial cable.

9. An improved signal lead-out apparatus according to claim 5 wherein said covering device includes a covering plate having a plurality of lugs (221) formed at both ends of an inner side thereof for engagement in said notches of said base body, and a plurality of pinch-in posts (222, 223) integrally formed on the inner side in conformity with cavities of said pinch-in means to forcibly press parallel conductors of the outgoing TV antenna wires into said cavities when being coupled with said base body.

* * * * *